March 14, 1933.  S. N. SENNA  1,901,359
TESTING APPARATUS
Filed May 6, 1929
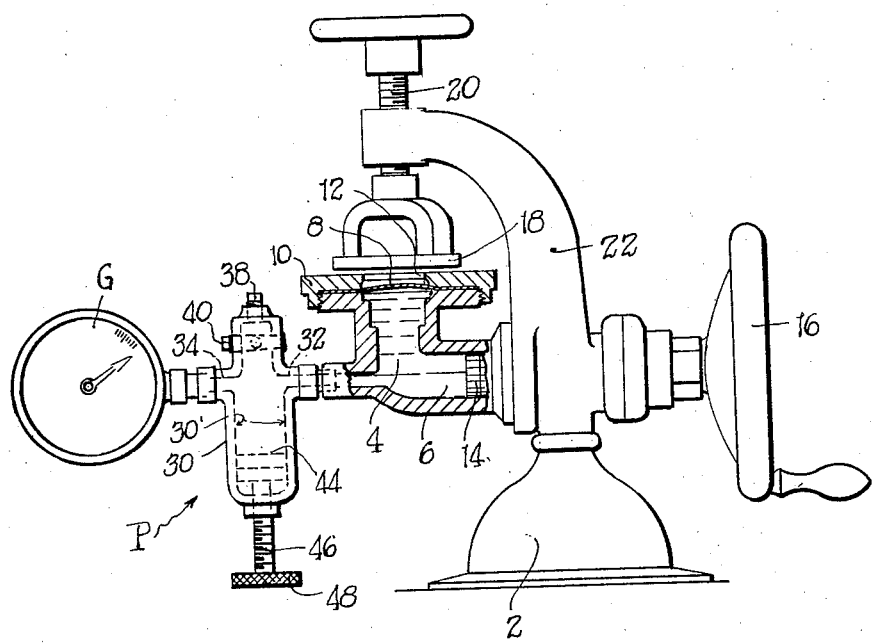
INVENTOR.
Samuel N Senna
BY Walter C Ross
ATTORNEY.

Patented Mar. 14, 1933

1,901,359

UNITED STATES PATENT OFFICE

SAMUEL N. SENNA, OF CHICOPEE, MASSACHUSETTS, ASSIGNOR TO B. F. PERKINS & SON, INC., OF HOLYOKE, MASSACHUSETTS, A CORPORATION OF MASSACHUSETTS

TESTING APPARATUS

Application filed May 6, 1929. Serial No. 360,695.

This invention relates to improvements in testing machines and is directed particularly to improvements in apparatus for testing paper and the like by rupturing specimens thereof by pressure.

This invention is particularly adapted for use in connection with testing apparatus of the type shown and described in United States Letters Patent No. 924,625 issued June 8, 1909 and in order to facilitate a clear understanding of the novel features of this invention the apparatus of the patent referred to will be briefly described.

In this apparatus a specimen of paper or fabric is clamped to a platform provided with a central aperture by a ring-like clamp. A diaphragm of elastic material below the platform is distended by fluid pressure up through the platform so that it engages and ruptures the specimen. The pressure of the fluid at the instant of rupture is indicated by a pressure gauge and the indication is taken as the strength of the specimen. The fluid for distending the diaphragm is contained in a chamber and is displaced by a piston either manually operated or driven from a source of power.

Due to varying temperature conditions, small leaks in the apparatus stretching of the diaphragm, etc., the amount of fluid in the chamber varies from time to time. This produces unsatisfactory results because in order to obtain the most accurate results it is desired to have the chamber completely filled with fluid so that it contacts with the diaphragm at all times.

Accordingly the novel objects of the invention are directed to the provision of means adapted to be associated with testing apparatus of the class referred to which will compensate for any variation in the amount of fluid to the end that more accurate tests may be made.

The novel features and advantages of the invention will be observed from the following description of the preferred form thereof, which for illustration purposes are shown in the accompanying drawing in which:

The figure is a side elevational view partly in section showing a testing machine having the novel features of the invention associated therewith.

Referring to the drawing in detail the invention will now be described.

A base is shown at 2 which is provided with a fluid chamber 4 and a bore or cylinder 6 in communication therewith. A diaphragm 8 of flexible stretchable material is clamped to the upper side of the chamber 4 by a platform 10 which is provided with a central aperture 12.

A piston 14 is movable back and forth in the bore 6 by a hand wheel 16 which is arranged for rotation as in U. S. Patent 924,625 referred to so that a liquid such as glycerin or the like in the chamber may be displaced to distend the diaphragm upwardly through the aperture in the platform 10.

A clamp 18 at the end of a rod 20 in threaded engagement with an arm 22 of the base is preferably in the form of a ring thereby providing a central aperture therethrough which corresponds with that of the platform. By clamping a specimen of paper or the like to the platform by means of the clamp the central portion thereof is ruptured as the liquid is displaced or when pressure is built up by a forward movement of the piston. The pressure attained at the time of rupture may be indicated by a pressure gauge and the pressure reading taken as the designation of the strength of the paper. This is ordinary practice.

As has been stated the amount of liquid in the chamber may vary due to various causes and the amount be decreased so that it does not contact with the under side of the diaphragm when the piston is in retracted position, which is objectionable. Furthermore it may be desirable to provide sufficient liquid to distend the diaphragm while the piston is in retracted position so that its upper side is normally level with the surface of the platform. It will be appreciated that the addition of liquid is accomplished ordinarily by removing the platform and diaphragm whereby it is difficult if not impossible to add the exact amount desired.

According to the novel features of the invention, I provide the means now to be described for displacing fluid so that the chamber will be filled to the extent desired.

A pump P consisting of a body 30 which is provided with a central chamber or bore 30' has passageways 32 and 34 in communication therewith. The passageway 32 is connected to the chamber 4 of the body 2 while the other passageway 34 is connected to a pressure indicating gauge G of well known form. The upper end of the bore of the body 30 is closed by a plug 38 in threaded engagement therewith and a valve plug 40 of usual form is provided which is rotatable in the body below the said plug.

A piston 44 carried by a rod 46 in threaded engagement with the body is moved back and forth along the bore by screwing the rod in and out of the body. A hand wheel 48 is fixed to the rod to facilitate the turning of the rod so as to move the piston back and forth along the bore. As will be seen the chamber, pump and gauge are interconnected.

In operation with a liquid in the chamber and pump the piston 44 may be moved back and forth along the bore to displace the liquid so that it fills up the chamber and engages the under side of the diaphragm. In this way it is possible to insure that the chamber is at all times filled with liquid. When it is desired to distend the diaphragm so that it is flush with the platform 10 when the piston 14 is in its retracted position, it is only necessary to displace the liquid by moving the piston 44 upwardly within the bore of the pump.

With the chamber thus filled to the extent desired, the test may be carried out by moving the piston 14 inwardly so as to displace the liquid and distend the diaphragm and rupture the specimen. The pressure attained is communicated of course through passageways 32 and 34 to the pressure gauge for the purpose described.

From the foregoing it will be observed that I have provided means in communication with the chamber which is operable independently of the piston for displacing the liquid therein whereby it is possible to vary the amount of liquid in the chamber as is desirable for most accurate results.

Having described the invention in the form at present preferred what I desire to claim and secure by Letters Patent is:

Testing apparatus of the class described comprising in combination, a base including a fluid chamber, a yieldable diaphragm clamped thereover, a piston associated with said chamber for displacing fluid therein, a pump having a bore in communication with said chamber, a piston in said bore at a side of its point of communication with said chamber and a valve plug in the bore at another side of said point of communication to facilitate introduction of fluid into said bore.

In testimony whereof I affix my signature.

SAMUEL N. SENNA.